(12) United States Patent
Champion et al.

(10) Patent No.: US 11,597,147 B2
(45) Date of Patent: Mar. 7, 2023

(54) ULTRASONIC SPREADING BLADES WITH KICKERS

(71) Applicant: HEWLETT-PACKARD DEVELOPMENT COMPANY, L.P., Spring, TX (US)

(72) Inventors: David A. Champion, Corvallis, OR (US); Adriaan Spierings, St. Gallen (CH); Thomas Bauer, St. Gallen (CH)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 16/608,240

(22) PCT Filed: Jul. 31, 2018

(86) PCT No.: PCT/US2018/044595
§ 371 (c)(1),
(2) Date: Oct. 25, 2019

(87) PCT Pub. No.: WO2020/027805
PCT Pub. Date: Feb. 6, 2020

(65) Prior Publication Data
US 2021/0354380 A1 Nov. 18, 2021

(51) Int. Cl.
*B29C 64/214* (2017.01)
*B29C 64/153* (2017.01)
(Continued)

(52) U.S. Cl.
CPC .......... *B29C 64/214* (2017.08); *B29C 64/245* (2017.08); *B33Y 30/00* (2014.12); *B29C 64/153* (2017.08); *B29C 2791/008* (2013.01)

(58) Field of Classification Search
CPC ...... B29C 64/214; B29C 64/153; B33Y 30/00
See application file for complete search history.

(56) References Cited

U.S. PATENT DOCUMENTS

| 5,688,464 A | 11/1997 | Jacobs et al. |
| 6,799,959 B1 | 10/2004 | Tochimoto et al. |

(Continued)

FOREIGN PATENT DOCUMENTS

| CN | 201168783 Y | 12/2008 |
| CN | 104802404 A | 7/2015 |

(Continued)

OTHER PUBLICATIONS

Kim, W. H., et al., "Evaluation of welding performance of 20 kHz and 40 kHz ultrasonic metal welding," IOP Conf. Series: Materials Science and Engineering, vol. 248, 2017, 7 pages.

(Continued)

*Primary Examiner* — Joseph S Del Sole
*Assistant Examiner* — Baileigh Kate Darnell
(74) *Attorney, Agent, or Firm* — Shook, Hardy & Bacon L.L.P.

(57) ABSTRACT

In example implementations, a spreading blade is provided. The spreading blade includes a body portion, an ultrasonic vibration source, and a kicker. The ultrasonic vibration source is coupled to a top portion of the body portion to apply a vibration along a cross-sectional length of the body portion. The kicker is coupled to a side facing a process direction at a bottom end of the body portion. The kicker comprises a tip formed by a combination of two angled surfaces that extend from a lateral side of the body portion.

13 Claims, 5 Drawing Sheets

(51) Int. Cl.
  *B22F 12/67* (2021.01)
  *B33Y 30/00* (2015.01)
  *B29C 64/245* (2017.01)

(56) References Cited

U.S. PATENT DOCUMENTS

| | | |
|---|---|---|
| 8,568,124 B2 | 10/2013 | Brunermer |
| 8,911,226 B2 | 12/2014 | Gunther et al. |
| 9,527,244 B2 | 12/2016 | El-Siblani |
| 9,586,290 B2 | 3/2017 | Buller et al. |
| 2009/0017219 A1 | 1/2009 | Paasche et al. |
| 2013/0316081 A1 | 11/2013 | Kovalcik et al. |
| 2015/0115490 A1 | 4/2015 | Reinarz |
| 2015/0258734 A1 | 9/2015 | Okamoto et al. |
| 2015/0266240 A1* | 9/2015 | Okamoto .............. B29C 64/165 264/109 |
| 2016/0361872 A1 | 12/2016 | Siblani |
| 2016/0361874 A1* | 12/2016 | Park .................... B29B 17/0404 |
| 2017/0239752 A1 | 8/2017 | Buller et al. |
| 2017/0355100 A1 | 12/2017 | Pateloup et al. |
| 2018/0015666 A1 | 1/2018 | Honda |
| 2020/0180227 A1 | 6/2020 | Voss et al. |

FOREIGN PATENT DOCUMENTS

| | | |
|---|---|---|
| CN | 105436501 B | 3/2016 |
| CN | 107803502 A | 3/2018 |
| DE | 102016202696 A1 | 8/2017 |
| EP | 3243584 A1 | 11/2017 |
| WO | WO2017179006 A1 | 10/2017 |
| WO | WO2017215870 A1 | 12/2017 |
| WO | 2020/027805 A1 | 2/2020 |

OTHER PUBLICATIONS

Lucas, M., et al., "Experimental and computational modelling of vibration performance of ultrasonic tools for manufacturing applications," UIA Symposium, 2002, 24 pages.

Wen-Long, D., et al., "Enhanced Working-Amplitude Distribution of Ultrasonic Wide-Blade Horn with the use of A Wave-tuning Plate," 19th International Congress on Acoustics Madrid, Sep. 2-7, 2007, 5 pages.

Wikipedia, "Sonotrode," retrieved at https://en.wikipedia.org/wiki/Sonotrode, retrieved on Apr. 13, 2022, 1 page.

* cited by examiner

ULTRASONIC SPREADING BLADES WITH KICKERS

BACKGROUND

Three dimensional (3D) printers can be used for additive printing. The three dimensional printers can create three-dimensional (3D) objects via the additive printing process. For example, a layer of build material can be dispensed onto a platform, and portions of each layer may be selectively solidified using an appropriate technique. For example, a fusing agent can be applied onto the build material in desired locations (e.g., locations that correspond to areas of the object that will be printed) and energy, such as heat, may be applied generally uniformly to the layer. Portions of the layer on which fusing agent is present may heat up more than portions on which no fusing agent is present, to cause those portions to melt, coalesce, and solidify. The process can then be repeated for each layer until printing of the 3D object is completed.

DETAILED DESCRIPTION

Examples described herein provide an ultrasonic spreading blade with one or more kickers. As discussed above, 3D printers may use a blade to form a smooth layer of build material on a build platform. Some blades can create compaction zones as the blade is moved across the layer of build material. The compaction zones can create undesirable divots or scratches in a surface of the 3D printed part.

Examples herein provide a blade with one or more kickers that improve the characteristics of formed layers of build material. For example, the blade with one or more kickers may help prevent the compaction zones as the blade is moved across the layer of build material on the build material bed. The one or more kickers can be a combination of surfaces at desired angles to form a tip that de-compacts build material in front of the blade as the blade is moved across the build material bed.

The blade may include a plurality of kickers to allow the blade to be used in either direction and rotated 180 degrees, as discussed in further details below. In other words, the blade may have up to four kickers (e.g., a kicker near a top edge on each lateral side and a kicker near a bottom edge on each lateral side). As a result, the blade may have extended life in the 3D printer.

The blade with kickers can also be used with ultrasonic vibrations. The ultrasonic vibrations may be applied in a vertical direction (e.g., a direction normal to the plane of the build material bed) or in a horizontal direction (e.g., a direction parallel to the plane of the build material bed.).

Figure 1:
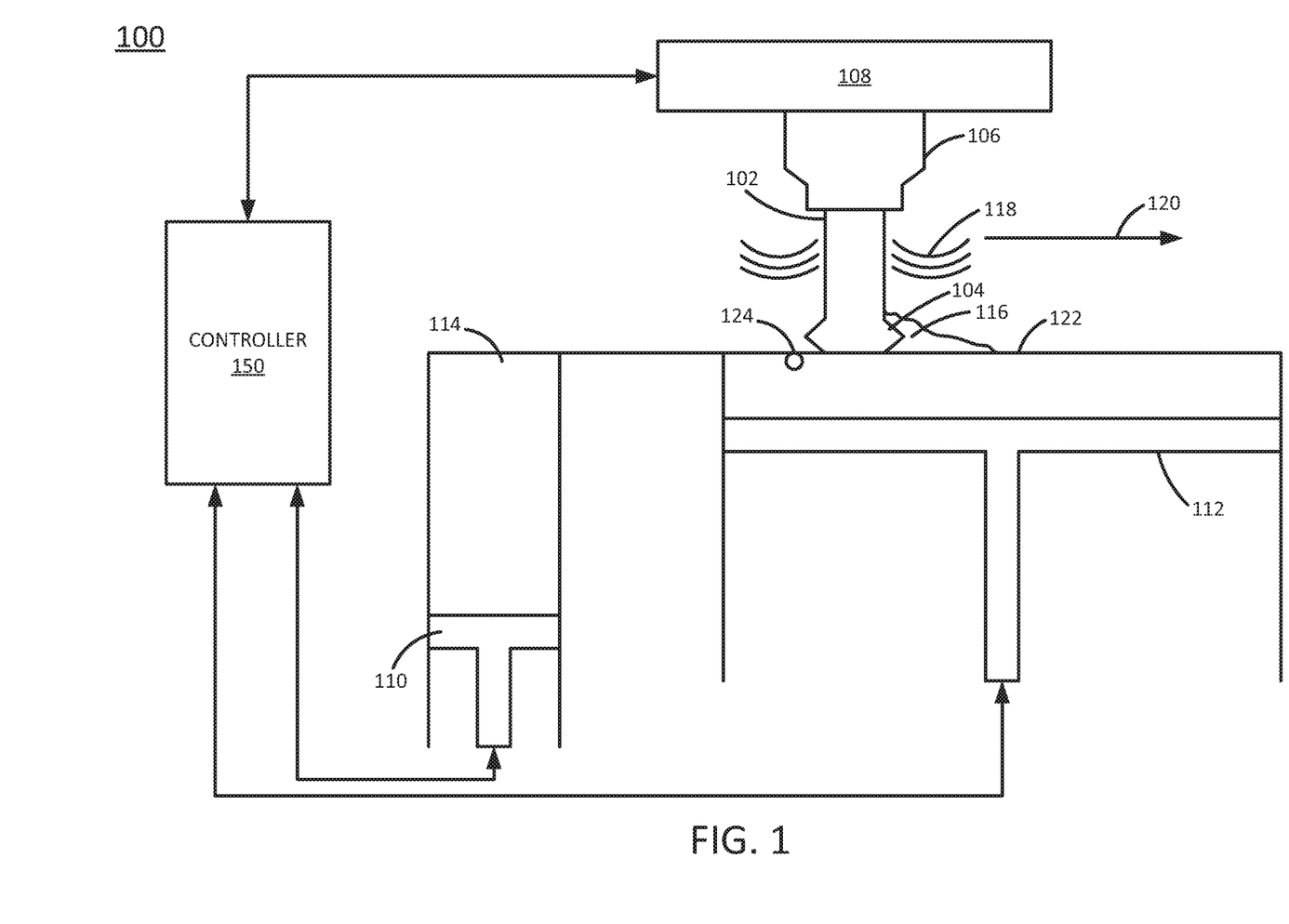
FIG. 1 is a block diagram of an example three dimensional printer with a spreading blade of the present disclosure.

FIG. 1 illustrates a block diagram of a 3D printer 100 of the present disclosure. In one example, the 3D printer may include a spreading blade 102. Although the spreading blade 102 is illustrated within the context of the 3D printer 100, it should be noted that the spreading blade 102 may be deployed in any type of system that spreads fine powder, such as a chemical binder system.

In one example, the spreading blade 102 may include a kicker 104 that is used to move build material 114 that is dispensed onto a build material bed 112 along a process direction 120 form a smooth layer of build material 122 on the build material bed 112. The build material 114 may be any type of powder (e.g. a metallic powder, a plastic powder, a ceramic powder, and the like), granular composition, powder-like material, short fiber build material, and the like. In an example, the build material 114 may have an average grain size that is below 70 microns.

The spreading blade 102 may also be deployed to spread powders that are not spreadable using previous wiper/roller designs. In other words, the spreading blade 102 may allow previously "non-spreadable" powders to become spreadable.

The spreading blade 102 may be coupled to an ultrasonic vibration source 108 via a coupling horn 106. The ultrasonic vibration source 108 may provide ultrasonic vibrations to the spreading blade 102. The vibrations are illustrated in FIG. 1 via lines 118.

In one example, the ultrasonic source 108 may provide ultrasonic vibrations in a vertical direction (e.g., in a direction perpendicular to the process direction 120). In another example, as discussed below, the ultrasonic source 108 may provide ultrasonic vibrations in the process direction 120. In one example, the vibrations may be provided at frequencies that are less than 42 kiloHertz (kHz). In an example, the vibrations may have a frequency that is approximately between 20 kHz and 42 kHz. In an example, the vibrations may have a frequency that is approximately between 32 kHz and 38 kHz.

A controller 150 may be communicatively coupled to the spreading blade 102 via a movable carriage (not shown) and the ultrasonic vibration source 108. In one example, movement of the spreading blade 102 may be controlled by a processor or controller 150 and a mechanically moving arm (not shown). The ultrasonic vibration source 108 may also be controlled via the controller 150.

In one example, the 3D printer 100 may include a first plunger 110 that moves up towards the spreading blade 102 to push the build material 114 onto the build material bed 112. The first plunger 110 may dispense the build material 114 to a layer thickness of approximately 20 microns to 150 microns. The spreading blade 102 may move over the build material 114 to form a smooth layer of build material 122 on the build material bed 112. The build material bed 112 may be a movable plunger that moves downward after each smooth layer of build material 122 is leveled by the spreading blade 102. The first plunger 110 and the build material bed 112 may be communicatively coupled to the controller 150. The movement of the first plunger 110 and the build material bed 112 may also be controlled by the controller 150.

As discussed above, some spreading blades move the build material, but can create compaction zones 124 in the smooth layer of build material 122. As noted above, the compaction zones 124 can be formed as the build material in an area 116 in front of the spreading blade 102 moves up against the blade and become compacted instead of moving as a free flowing fluidized build material. When the compaction zones 124 are in an area of the smooth layer of build material 122 that is part of the printed 3D object, the compaction zones 124 can cause divots or scratches on the surface of the final 3D printed object or part. The compaction zones 124 can also reduce structural integrity of the 3D printed object when located on an interior portion of the 3D printed object. Although a single compaction zone 124 is illustrated in FIG. 1, it should be noted that multiple compaction zones 124 can be formed along a smooth layer of build material 122.

In one example, the compaction zone 124 may be formed due to a variety of different parameters. For example, factors that may influence the formation of the compaction zone 124 may include a layer thickness, a particle size distribution (e.g., an absolute number or a width of the distribution, a particle shape, an amplitude and frequency of the vibrations applied to the spreading blade 102, a moving speed of a coating device, and the like.

In one example, the kicker 104 of the spreading blade 102 may at least partially eliminate the compaction zone 124. The kicker 104 may move through an area 116 that can cause the compaction zones 124 to be formed, thereby breaking up any compacted build material.

Figure 2:
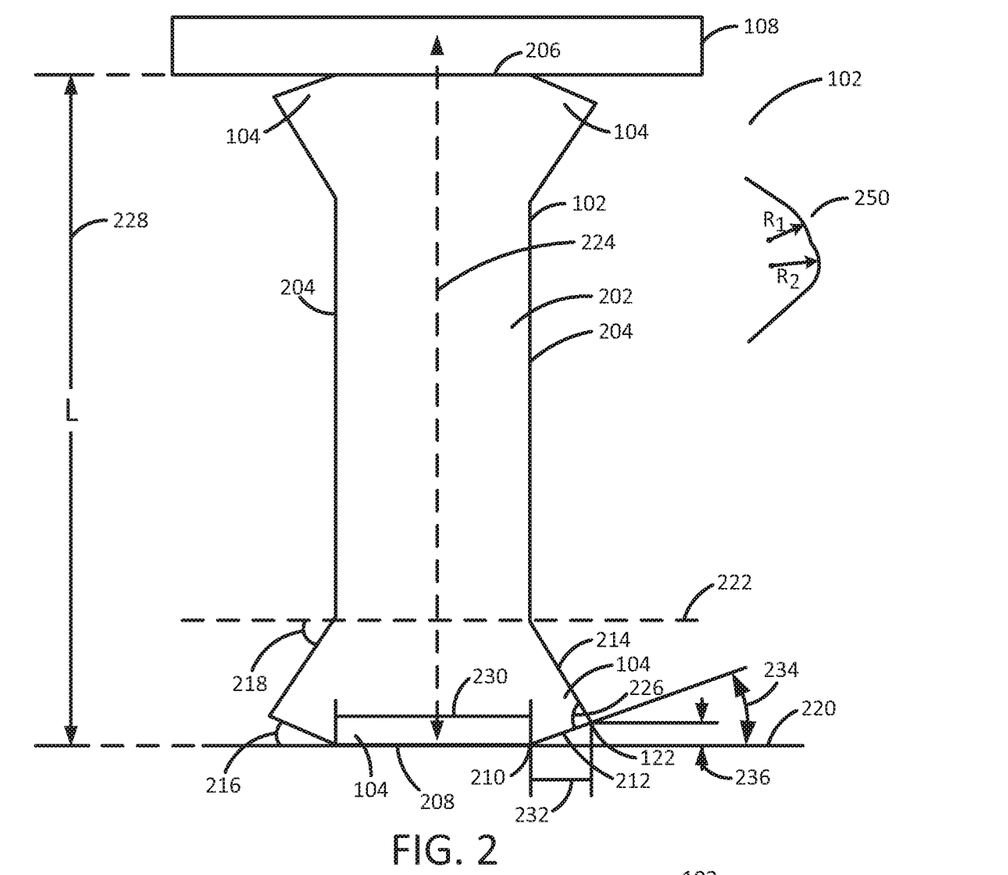
FIG. 2 is a side cross-sectional view of an example of the spreading blade with the kickers of the present disclosure.

FIG. 2 illustrates a cross-sectional side view of an example of the spreading blade 102. In one example, the spreading blade 102 may include a body portion 202. The body portion 202 may include lateral sides 204. The body portion 202 may include a top side 206 and a bottom side 208.

In one example, the kicker 104 may include a tip 122 that extends from the lateral side 204. In one example, the tip 122 may extend from the lateral side 204 that faces the process direction 120. As discussed below, if the blade 102 includes multiple kickers 104 the tip 122 may extend from either lateral side 204.

In one example, the tip 122 may be formed by a first surface 212 and a second surface 214 that are angled towards one another. For example, the tip 122 may be formed where the two angled surfaces 212 and 214 meet to form an acute angle 122 (e.g., an angle that measures less than 90 degrees). The dimensions of the kicker 104 may vary based on a particular application and a type of build material 114 that is dispensed. In an example, the distance from the lateral side 204 to the tip 122 may be approximately 2-5 millimeters (mm). In an example, the distance from the lateral side 204 to the tip 122 may be approximately 3 mm. In an example, a distance between the lateral sides 204 may be approximately 6-10 mm. In an example, the distance between the lateral sides 204 may be approximately 8 mm.

In one example, the first surface 212 may extend from an edge 210 that is formed by the bottom side 208 and the lateral side 204 of the body portion 202. In one example, the second surface 214 may extend from the lateral side 204 above the first surface 212.

Figure 4:
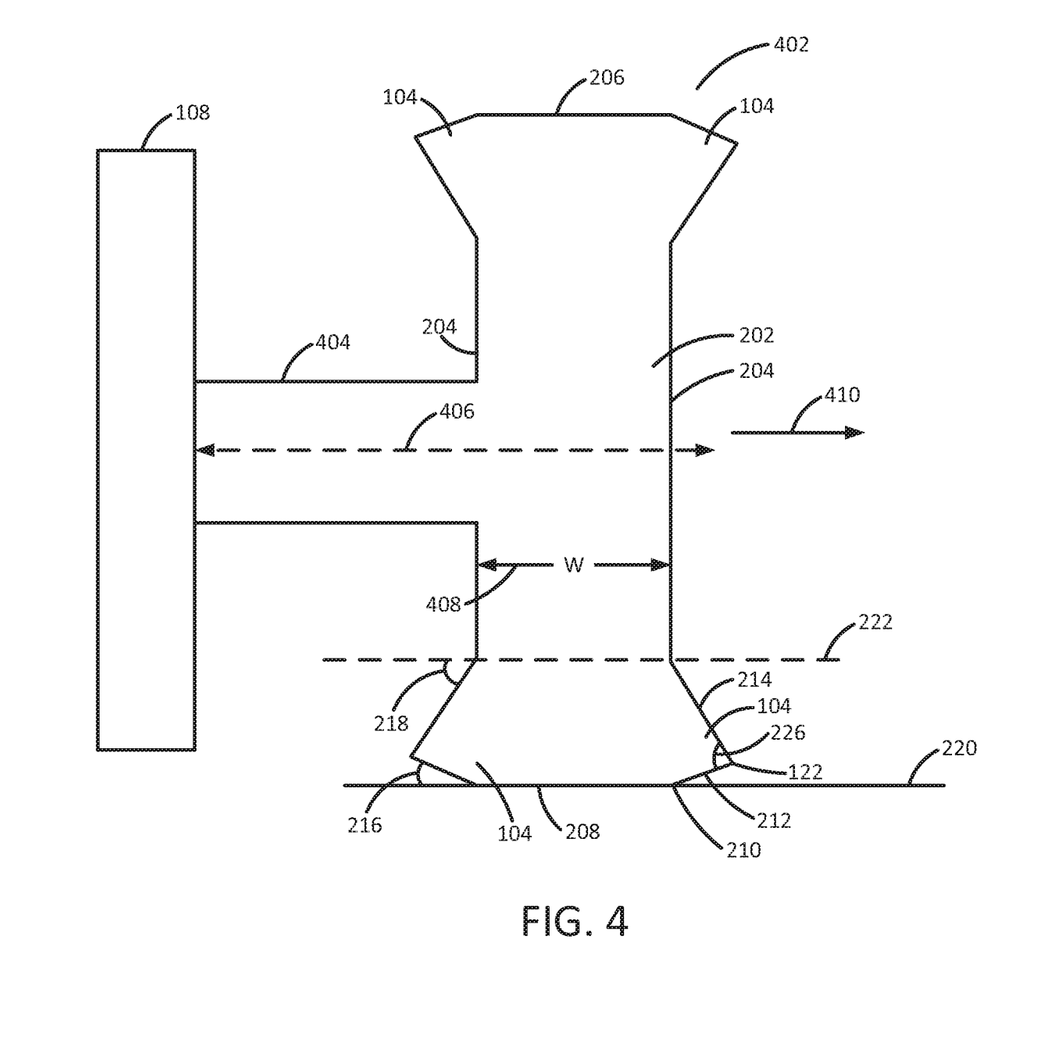
FIG. 4 is a side cross-sectional view of an example of a spreading blade with kickers having horizontal ultrasonic vibrations of the present disclosure.

In one example, the first surface 212 and the second surface 214 may be positioned to form an angle 216 and an angle 218, respectively. The angles 216 and 218 may be measured relative to respective horizontal surfaces as shown in FIG. 4. The angle 216 and the angle 218 may be selected such that the tip 122 is located in the area 116 that can cause the compaction zone 124 to form. In addition, the angle 216 may be selected to ensure that the first surface 212 can properly move the build material 114 that is dispensed forward and outward. The angle 218 (also referred to as the avalanche angle) may be selected to ensure that the build material 114 does not collect on top of the second surface 214.

In one example, the angle 216 may be measured relative to the first surface 212 and a plane 220 that is parallel to the surface of the build material bed 112. In one example, the angle 216 may be approximately 1 degree to 15 degrees. In one example, the angle 216 may be approximately 2 degrees to 5 degrees. In one example, the angle 216 may be approximately 3 degrees.

In one example, the angle 218 may be measured relative to the second surface 214 and a plane 222 that is parallel to the plane 220 or the surface of the build material bed 112. In one example, the angle 218 may be greater than 35 degrees, but less than 90 degrees. In one example, the angle 218 may be approximately 45 degrees.

The spreading blade 102 may include four kickers 104. For example, a first kicker may be located on the lateral side 204 near the bottom side 208 in the process direction 120. A second kicker 104 may be located on the lateral side 204 near the bottom side 208 away from the process direction 120. A third kicker 104 may be located on the lateral side 204 near the top side 206 in the process direction 120. A fourth kicker 104 may be located on the lateral side 204 near the top side 206 away from the process direction 120.

Having multiple kickers 104 may improve the usability and longevity of the spreading blade 102. For example, the spreading blade 102 may be removed from the ultrasonic vibration source 108, reoriented or repositioned, and re-attached to the ultrasonic vibration source 108. In example, the spreading blade 102 may be rotated 180 degrees around an axis 224 when one of the kickers 104 becomes dull. In other words, the kicker 104 that was previously facing away from the process direction 120 may be facing in the process direction 120 after the spreading blade 102 is rotated 180 degrees around the axis 224. The tip 122 of the kicker 104 may become dull when the tip 122 unable to prevent the formation of the compaction zone 124. For example, constant use of a kicker 104 may cause the build material 114 to gradually erode the tip 122.

In addition, the spreading blade 102 may be flipped 180 degrees around the plane 222 and then rotated around 180 degrees around the axis 224. In other words, a kicker 204 near the top side 206 and facing away from the process direction 120 may be moved into a position to contact the build material 114 as the spreading blade 102 moves across the build material 114. Thus, the four kickers 104 allow the spreading blade 102 to be rotated and flipped for continued use.

The spreading blade 102 may include the ultrasonic vibration source 108 on the top side 206 of the spreading blade 102. As noted above, in one example, the ultrasonic vibrations may have a frequency between approximately 20 kHz to 42 kHz and have an amplitude between 5 microns to 20 microns. Thus, the ultrasonic vibration source 108 may apply ultrasonic vibrations in a vertical direction. In other words, the vibration may be applied along a cross-sectional length 228 of the body portion 202 or parallel to the axis 224. Said another way, the vibration may be applied in a direction that is normal or perpendicular to the process direction 120.

In one example, the kicker 104 may also have a sweep feature. The location of the tip 122 may be to maximize the sweep feature of the kicker 104. In one example, the sweep feature may be based on a bottom thickness 230, a front sweep length 232, a front sweep angle 234, and a front sweep depth 236. In one example, the bottom thickness 230 may be measured as shown by the lines in FIG. 2. In one example, the front sweep length 232 may be measured from one end of the bottom side 208 to the tip 122. In one example, the front sweep angle 234 may be equivalent to the angle 216. In one example, the front sweep depth 236 may be measured from the tip 122 to the bottom side 208 as shown in FIG. 2.

In one example, the sweep depth may depend on a desired layer depth. A compaction may take powder from 20% to 70%. Given a print layer desired final depth, using the front sweep angle 234 per equation 1 below gives a sweep depth 236 and the equation 2 below gives the front sweep length 232.

$$\text{Front sweep depth} = \text{print layer desired final powder depth} * (1-(\text{initial powder compaction})/(1-(\text{build layer compaction desired})))$$
Equation 1: Sweep Depth Calculation $$\text{Front sweep length} = ((\text{front sweep depth})/\text{TAN}(\text{front sweep angle}))$$
Equation 2: Sweep Length Calculation Table 1 below provides example values of the front sweep depths 236 and front sweep lengths 232 for various front sweep angles 234, print layer desired final powder depths, initial powder compaction, and desired powder compaction.

TABLE 1

EXAMPLE VALUES

| Print Layer Desired Final Powder Depth, um | Initial Powder Compaction, in Build Pile | Build Layer Compaction desired | Front sweep depth | Front sweep angle | Front sweep length |
|---|---|---|---|---|---|
| 20 | 20% | 70% | 53 | 2 | 1527 |
| 20 | 20% | 70% | 53 | 3 | 1018 |
| 20 | 20% | 70% | 53 | 10 | 302 |
| 40 | 20% | 70% | 107 | 2 | 3055 |
| 40 | 20% | 70% | 107 | 3 | 2035 |
| 40 | 20% | 70% | 107 | 10 | 605 |
| 70 | 20% | 70% | 187 | 2 | 5345 |
| 70 | 20% | 70% | 187 | 3 | 3562 |
| 70 | 20% | 70% | 187 | 10 | 1059 |
| 100 | 20% | 70% | 267 | 2 | 7636 |
| 100 | 20% | 70% | 267 | 3 | 5088 |
| 100 | 20% | 70% | 267 | 10 | 1512 |

In one example, a transition radius may be approximately 50 microns. The transmission radius may be a point where an end of the surface 212 meets an end of the bottom side 208. The transition radius may be provided to anticipate the wear induced rounding of the flat bottom side 208.

In one example, the tip 122 may be formed as curve or a compound curve 250. For example, the compound curve may be comprised of surfaces having two different radii R1 and R2. Depending on the characteristics of the powder 114, the compound curve 250 may aid compaction.

Figure 3:
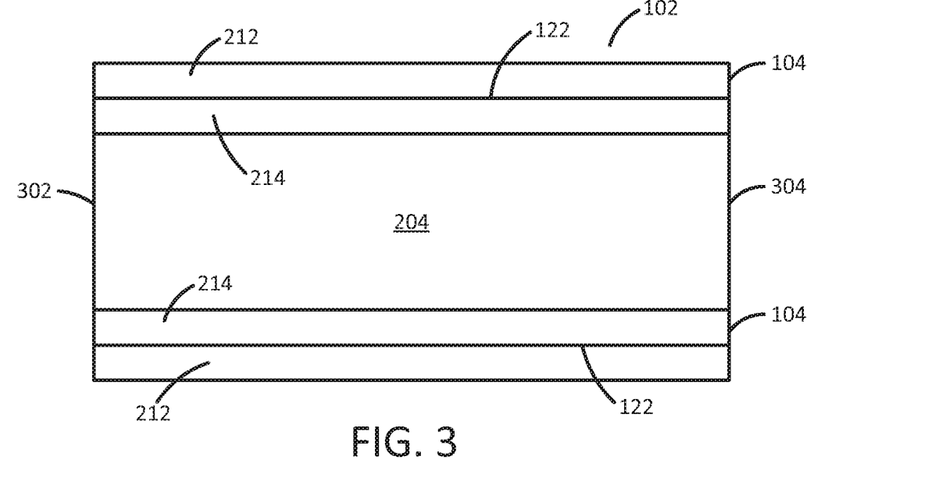
FIG. 3 is a front view of an example of the spreading blade with kickers of the present disclosure.

FIG. 3 illustrates a front view of the spreading blade 102. FIG. 3 illustrates the kicker 104 on the top side 206 and the bottom side 208 of the lateral side 204. The spreading blade 102 may also include kickers 104 on the opposite lateral side 204 near the top side 206 and the bottom side 208, as illustrated in FIG. 2.

In one example, the spreading blade 102 and the kicker 104 may have a width measured from a left side 302 to the right side 304. The width may be sized to correspond to a width of the build material bed 112. In other words, the kicker 104 may run across the entire width of the spreading blade 102.

FIG. 4 illustrates a cross-sectional side view of another example of a spreading blade 402. The spreading blade 402 may be similar to the spreading blade 102 in all respects where similar reference numerals are used. For example, the spreading blade 402 may have a body portion 202, lateral side 204, a top side 206, and a bottom side 208.

The spreading blade 402 may have kickers 104. The kickers 104 may include a tip 122 that extends from a lateral side 204 facing a process direction 410. The tip 122 may be formed by a first surface 212 and a second surface 214 that are angled towards one another to form an acute angle 226. The first surface may be positioned at an angle 216 and the second surface may be positioned at an angle 218. The ranges for the angles 216 and 218 may be the same as the angles 216 and 218 illustrated in FIG. 2 and described above.

However, unlike the spreading blade 102, the spreading blade 402 may include a member 404 that extends horizontally from a lateral side 204 that faces away from the process direction 410. In other words, the member 404 may extend along an axis 406. The ultrasonic vibration source 108 may be coupled to the member 404 (e.g., using a coupling horn not shown).

The ultrasonic vibration source 108 may apply an ultrasonic vibration along a cross-sectional width 408 of the body portion 202. In other words, the vibration may be applied in a direction that is parallel to the process direction 410 or in a direction along the axis 406.

In one example, the vibrations may be applied at a slight angle to the axis 406. For example, the ultrasonic vibration source 108 may be slightly angled relative to the axis 406 to provide angled vibrations (e.g., +/−10 degrees relative to the axis 406).

In one example, the spreading blades 102 and 402 may be fabricated from a metal, a hard plastic, a ceramic, and the like. The kickers 104 may be molded as part of the spreading blade 102 or 402. In other words, the kickers 104 may be part of a single piece that forms the spreading blades 102 and 402.

In another example, the kickers 104 may be a removable piece. For example, the kickers 104 may be mechanically slid onto, or mechanically coupled to, the lateral sides 204 of the body 202 of the spreading blade 102 or 402. As a result, the cost of using the spreading blades 102 and 402 may be reduced as the kickers 104 may be replaced rather than replacing the entire spreading blade 102 or 402.

Figure 5:
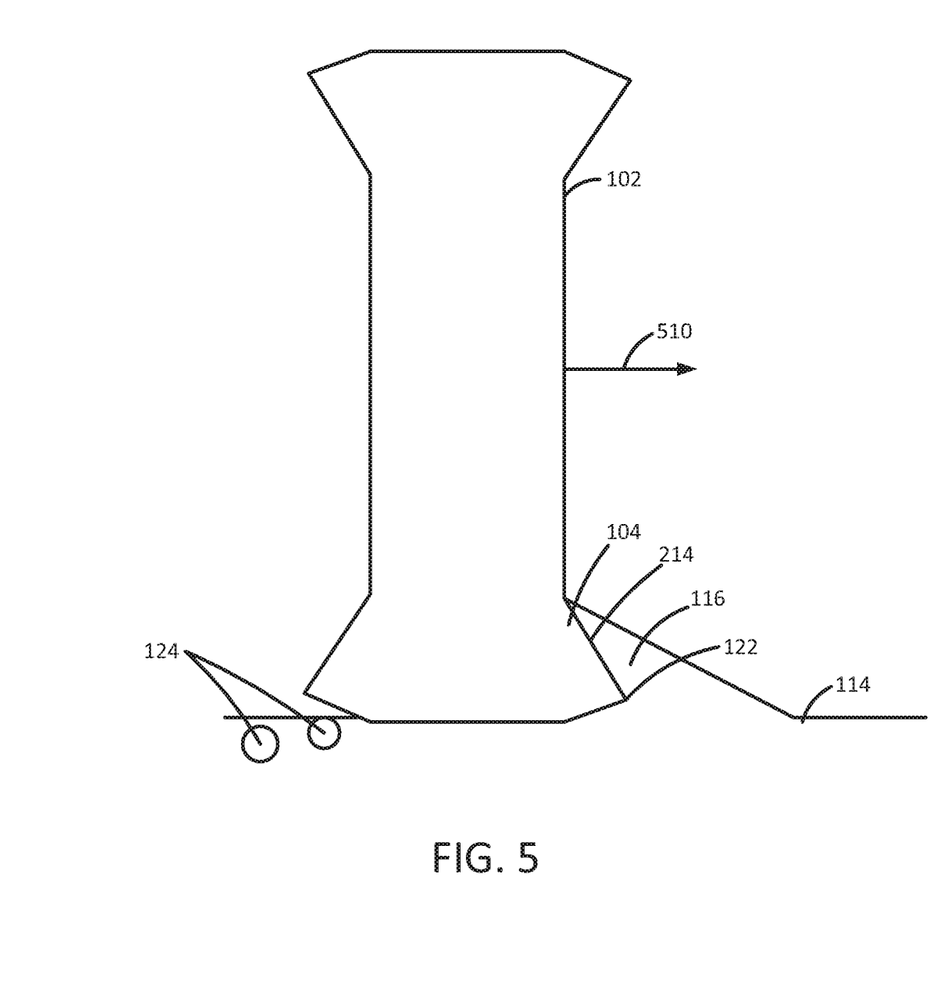
FIG. 5 is a block diagram of an example of the spreading blade with kickers operating in a build material bed of the three dimensional printer of the present disclosure.

FIG. 5 illustrates an example of the spreading blade 102 operating in the bed of build material 114. FIG. 5 illustrates how the tip 122 may be located to move across the areas 116 that can cause the compaction zone 124 to form. Thus, as the spreading blade 102 moves in a process direction 510, the tip 122 of the kicker 104 may move build material 114 that is located in the area 116 that causes the compaction zone 124 to form. As a result, the build material 114 may be prevented from forming compacted clumps of build material that may create divots or scratches on a surface of the printed 3D object.

In addition, as the spreading blade 102 moves in the process direction 510, the build material 114 may slide off of the second surface 214 of the kicker 104. Thus, the angle of the second surface 214 is set to the avalanche angle where the build material 114 slides off of the second surface 214 and does not collect on top of the second surface 214. As the build material 114 slides off of the second surface 214, the kicker 104 may move the build material 114 out and forward in the process direction 510.

Thus, the spreading blade 102 provides features that allow the spreading blade 102 to efficiently level a layer of the build material 114. The spreading blade 102 may include the kicker 104 having a tip 122 that may prevent compaction zones 116 in the layer of the build material 114.

In addition, the spreading blade 102 may be used for a longer period of time than other blades as the spreading blade 102 can be installed in a variety of different orientations. For example, the spreading blade 102 may include multiple kickers 104 such that the spreading blade 102 may be flipped, rotated, or flipped and rotated, as described above.

Figure 6:
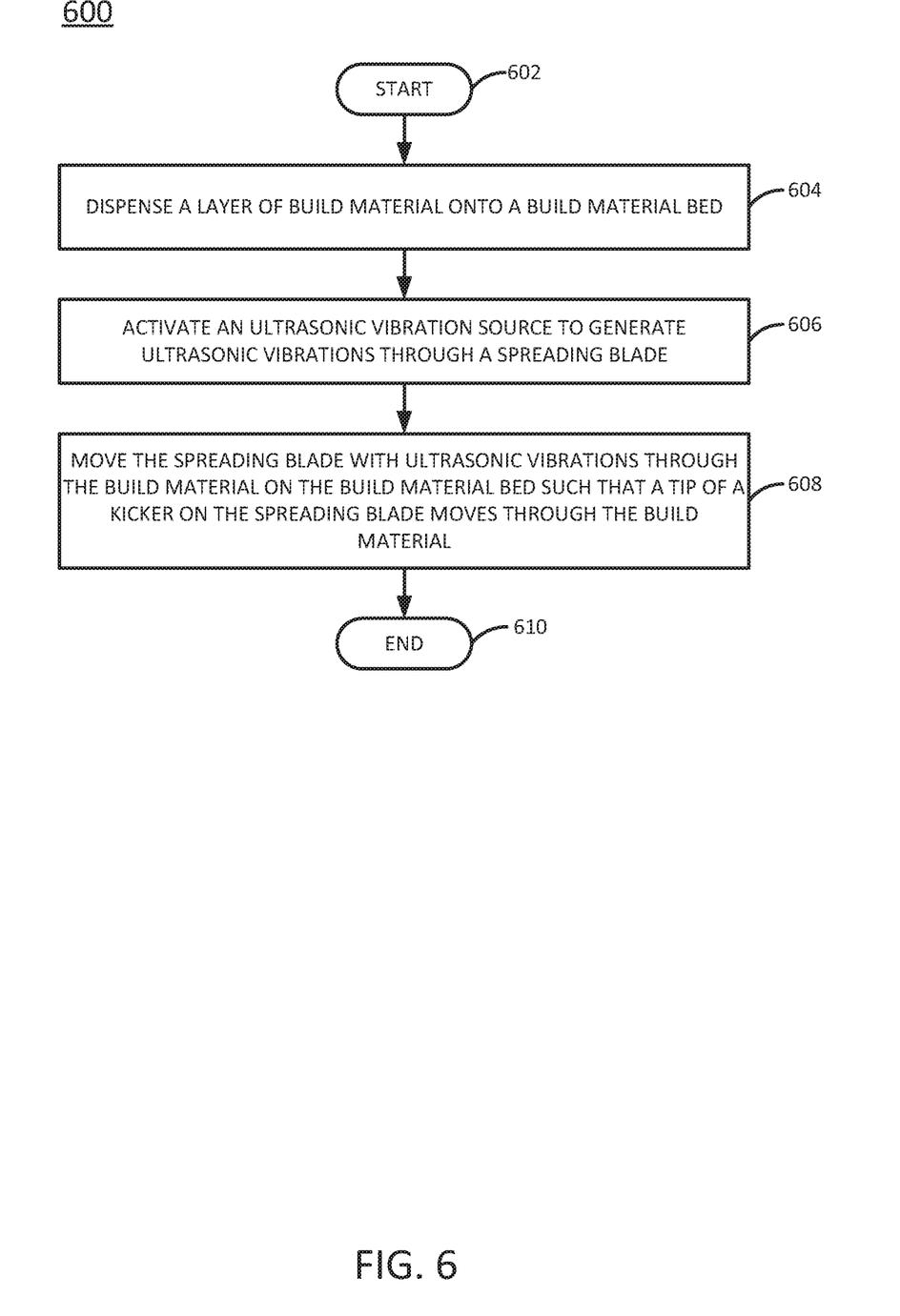
FIG. 6 is a flow chart of an example method to form a layer of build material with a spreading blade with kickers and ultrasonic vibrations of the present disclosure.

FIG. 6 illustrates a flow diagram of an example method 600 for forming a layer of build material with a spreading blade with kickers and ultrasonic vibrations. In an example, the method 600 may be performed by the 3D printer 100.

At block 602, the method 600 begins. At block 604, the method 600 dispenses a layer of build material onto a build material bed. For example, a plunger of a build material supply may move the build material onto the build material bed.

At block 606, the method 600 activates an ultrasonic vibration source to generate ultrasonic vibrations through a spreading blade. For example, the ultrasonic vibrations may be applied in a vertical direction or a horizontal direction through the spreading blade. The ultrasonic vibrations may be applied at a frequency that is between approximately 20 kHz to 42 kHz and have an amplitude between 5 microns to 20 microns.

At block 608, the method 600 moves the spreading blade with ultrasonic vibrations through the build material on the build material bed such that a tip of a kicker on the spreading blade moves through the build material. For example, the spreading blade may create a smooth layer of the build material on the build material bed. In addition, the tip of the kicker may prevent the creation of compaction zones in the smooth layer of build material that is printed to form a 3D object. The spreading blade and the kicker may be manufactured as described above.

In one example, a layer of the 3D object may be printed in the layer of smooth build material. For example, a fusing agent may be applied to select locations on the layer of smooth build material to print a layer of the 3D object. An energy source (e.g., infrared light) may be applied to the fusing agent to melt and fuse the build material. The blocks 604, 606, and 608 may be repeated for each layer of the 3D object until printing of the 3D object is completed. At block 610, the method 600 ends.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A spreading blade, comprising:
a body portion;
an ultrasonic vibration source coupled to a top portion of the body portion to apply a vibration along a cross-sectional length of the body portion; and
a kicker coupled to a side of the body portion at a bottom end of the body portion, wherein the kicker comprises a tip that extends from a lateral side of the body portion, wherein the tip is formed by two angled surfaces that extend from the lateral side of the body portion, wherein a first surface of the two angled surfaces extends from an edge formed by the bottom side and the lateral side of the body portion.

2. The spreading blade of claim 1, wherein the first surface is at an angle between 1 degree and 15 degrees relative to a plane of a build material bed.

3. The spreading blade of claim 1, wherein a second surface of the two angled surfaces extends from the lateral side of the body portion above the first surface.

4. The spreading blade of claim 3, wherein the second surface is at an angle that is greater than 35 degrees and less than 90 degrees relative to a plane that is parallel to the plane of the build material bed.

5. The spreading blade of claim 1, wherein the tip comprises an acute angle formed by the two angled surfaces.

6. A spreading blade, comprising:
a body portion;
a member that extends horizontally from a lateral side of the body portion;
an ultrasonic vibration source coupled to the member to apply a vibration along a cross-sectional width of the body portion; and
a kicker coupled to a side of the body portion at a bottom end of the body portion, wherein the kicker comprises a tip that extends from a lateral side of the body portion, wherein the tip is formed by two angled surfaces that extend from the lateral side of the body portion, wherein a first surface of the two angled surfaces extends from an edge formed by the bottom side and the lateral side of the body portion.

7. The spreading blade of claim 6, wherein the first surface is at an angle of approximately 3 degrees relative to a plane of a build material bed.

8. The spreading blade of claim 6, wherein a second surface of the two angled surfaces extends from the lateral side of the body portion above the first surface.

9. The spreading blade of claim 8, wherein the second surface is at an angle of approximately 45 degrees relative to a plane that is parallel to the plane of the build material bed.

10. The spreading blade of claim 6, wherein the ultrasonic vibration source is coupled to a controller to control movement of a build material bed, an amount of build material dispensed by a build material supply, and movement of the spreading blade having the kicker and ultrasonic vibrations.

11. The spreading blade of claim 10, wherein the vibration is applied in a direction normal to a plane of the build material bed or a direction parallel to the plane of the build material bed at a frequency that is between 20 kiloHertz (kHz) and 42 kHz and have an amplitude that is between 5 microns and 20 microns.

12. The spreading blade of claim 6, wherein the spreading blade comprises a plurality of kickers.

13. The spreading blade of claim 12, wherein a first kicker of the plurality of kickers is located on a first side along a bottom of the spreading blade, a second kicker of the plurality of kickers is located on a second side along the bottom of the spreading blade, a third kicker of the plurality of kickers is located on the first side along a top of the spreading blade, and a fourth blade is located on the second side along the top of the spreading blade.

* * * * *